July 10, 1928.  1,676,416
F. W. STEWART
COMBINED STEERING WHEEL AND IGNITION LOCK
Filed Jan. 12, 1925  2 Sheets-Sheet 1
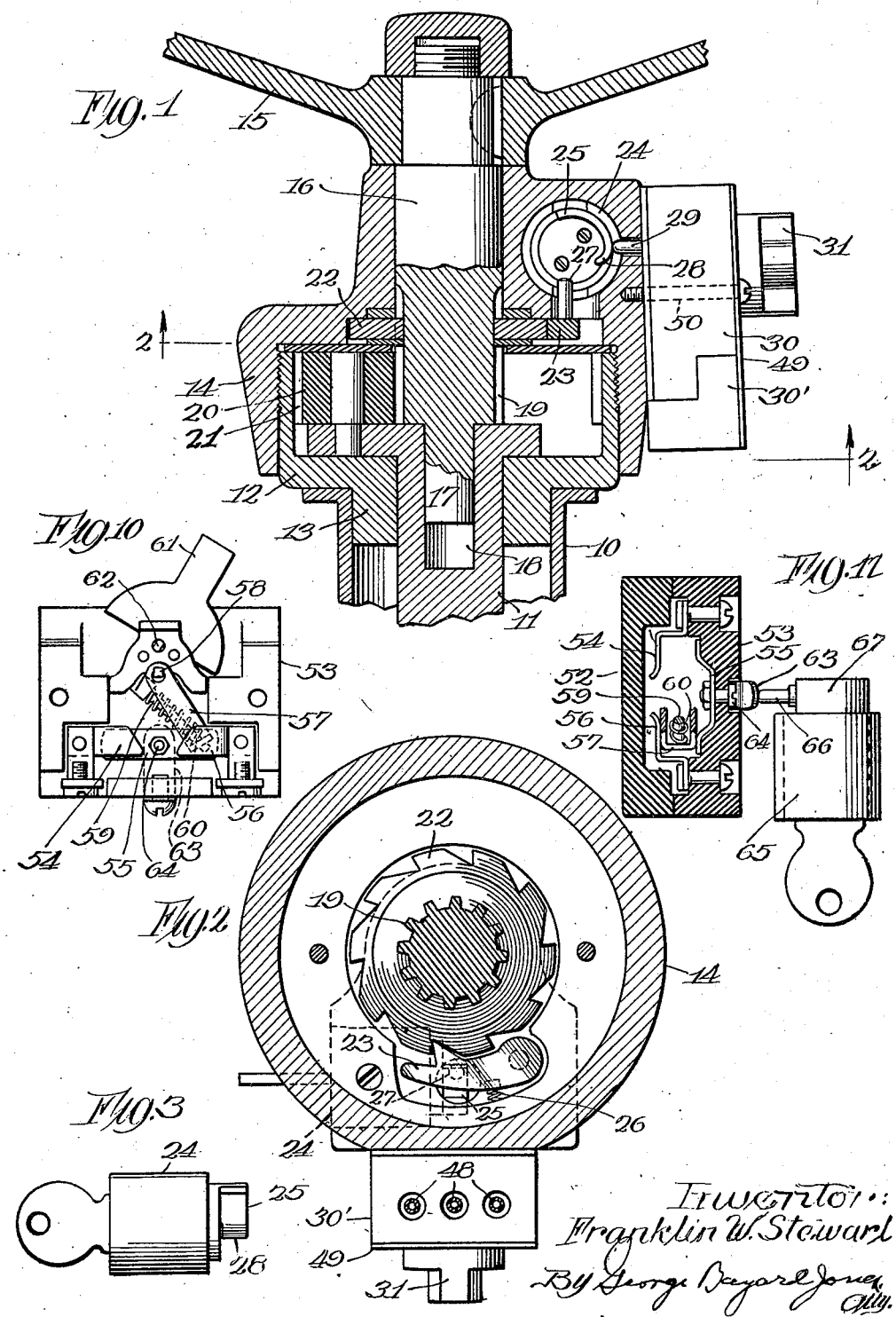
Inventor:
Franklin W. Stewart
By George Bayard Jones
Atty.

July 10, 1928.
F. W. STEWART
1,676,416
COMBINED STEERING WHEEL AND IGNITION LOCK
Filed Jan. 12, 1925    2 Sheets-Sheet 2
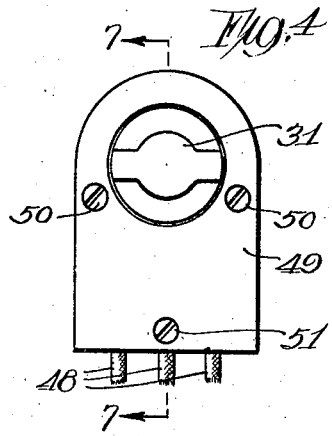
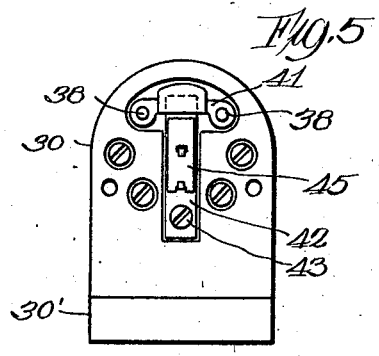
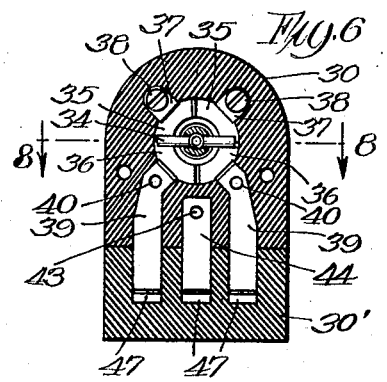
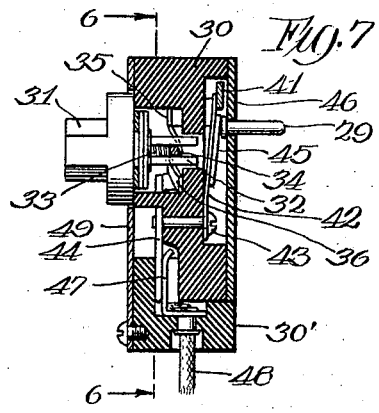
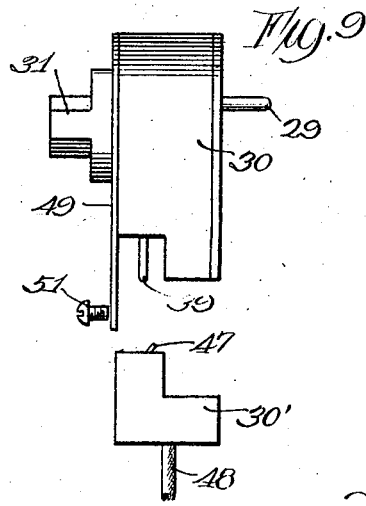
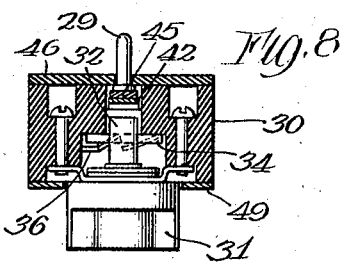
Inventor:
Franklin W. Stewart
By George Bayard Jones
Atty.

Patented July 10, 1928.

1,676,416

UNITED STATES PATENT OFFICE.

FRANKLIN W. STEWART, OF CHICAGO, ILLINOIS.

COMBINED STEERING WHEEL AND IGNITION LOCK.

Application filed January 12, 1925. Serial No. 1,724.

My invention relates to improvements in means for locking automobiles against theft. More specifically it relates to an improved device for locking some part of the automobile, such as the steering wheel or gear shift lever to render the same inoperative and simultaneously opening the ignition circuit.

Locks for this general purpose have been proposed heretofore, but some of them are objectionable as they require two operations, one the turning of the key and the other the moving of some locking part, whereas others are objectionable in that the switch structure is combine with the rest of the locking device in such a way as to render the switch inaccessible in case of repairs or replacement.

One object of my invention is to overcome these difficulties by providing a device wherein the simple actuation of the key results in locking the vehicle and simultaneously opening the ignition circuit, either battery or magneto.

Another object is to provide an improved construction wherein a switch of simple rugged form may be readily applied to the housing containing the lock and be actuated by a pin passing through the wall of said housing whereby said switch is readily accessible.

A further object is to provide a simple lock of this character which can be applied to the planetary gear type of lock with practically no change therein other than a substitution of one cover for another without requiring the services of a skilled mechanic.

The embodiment of the invention shown in the drawings is adapted for steering wheels of the planetary gear type, steering post lock type, and gear shift lock type, although I do not limit myself to these types, as the invention is applicable to all existing types of locks.

Figure 1 is a sectional elevation of a commercial embodiment of the invention.

Fig. 2 is a section on line 2—2 of Fig. 1.

Fig. 3 is a side elevation of the lock cylinder and adjuncts.

Fig. 4 is a front elevation of the switch housing.

Fig. 5 is a rear elevation thereof.

Fig. 6 is a central sectional elevation thereof.

Fig. 7 is a section on line 7—7, Fig. 4.

Fig. 8 is a section on line 8—8, Fig. 6, and

Fig. 9 is a side elevation of the switch housing showing the two parts detached.

Fig. 10 is an elevation of a modified form of switch.

Fig. 11 is a section of Fig. 10, with the lock in elevation.

The steering wheel mechanism may comprise the well-known tubular housing 10 which encloses the steering post 11, with the planetary gear housing 12 arranged at the upper end thereof and having a depending flange 13 which fits the correspondingly shaped opening in said tubular housing, and which has a circular central opening providing a bearing for the upper end of steering wheel post 11.

A cap 14 is screw-threaded over the housing 12 in the usual manner. Above the cap the steering wheel 15 is mounted on a short shaft 16, the latter having a reduced extension 17 which fits within a central opening 18 in post 11. The sun gear 19 turns with the shaft 16 and meshes with the planetary gears 20, which in turn mesh with the annular gear 21 formed in the circular wall of the housing 12.

A ratchet 22 and pivoted pawl 23 cooperate to lock the wheel against rotation in one direction, in substantially the manner described also in my co-pending application Serial No. 679,089, filed December 7, 1923.

The lock 24 may be of the cylindrical type, and has a projecting lug 25 at its inner end which withdraws the pawl from the ratchet against the action of the spring 26, said lock engaging a pin 27 on said pawl when the lock cylinder is rotated by the usual key. A peripheral cam surface 28 is arranged on the lock cylinder to move a sliding pin 29 outwardly when the lock cylinder is rotated. (See Fig. 1.) This movement of the pin results in opening a circuit which is common to the battery circuit and magneto circuit, as hereinafter described.

The switch comprises preferably a two-part structure of insulation 30 and 30', which parts are separable. The switch is of the type to render either a battery circuit or a magneto circuit available as the ignition circuit. In actuating the switch, the operator rotates the handle or button 31, thereby rotating a split shaft 32 having a coiled spring 33 therein which presses outwardly against a transverse cross-bar 34 of conducting material. At each quarter turn of the switch handle, the opposite ends of said cross-bar ride up inclined surfaces and then drop to a lower surface. There are preferably four of these inclined steps, as shown in Fig. 6. Said inclined steps consist of arc-shaped metal contacts, two of which, 35, are arranged at the top and the other two, 36, are arranged below the axis of the rotatable shaft 32. The contacts 35 are each provided with an extension 37 secured in a recess in the insulating block by screws 38. The arc-shaped contacts 36 are likewise provided with extensions 39 held in recesses in the insulating block by screws 40. A strip of metal 41 in the rear face of the block is secured in place by the two screws 38, which constitutes a common connection for the arc-shaped contacts 35. A resilient circuit closing metallic strip 42 is also arranged in said rear recess and is secured by a screw 43 to a spring-contact 44 on the front face of the block.

A plate of insulating material 45 is suitably secured to the resilient contact 42 and is engaged by the reciprocating pin 29 passing through an opening in the rear cover plate 46. Three spring contacts 47 are mounted on the lower insulating block 30' and are connected to suitable conductors 48, as shown in Figs. 4 and 7. One of the outside conductors in Fig. 4 represents the battery circuit and the other outside conductor represents the magneto circuit, and the middle conductor is a common return conductor.

The rotation of the switch handle 31 will alternately close the battery and magneto circuits, whereas movement of the pin 29 will open either of the circuits by moving the spring contact 42 away from the transverse contact 41, thereby opening either the battery circuit or magneto circuit, depending upon the position of the circuit closing crossbar 34. In this connection it will be seen that either the battery or the magneto circuit is always closed by the rotatable switch and it is impossible for the operator to so manipulate the switch as to leave it in some intermediate or inoperative position. That is to say, the cross-bar 34 rides up the two opposite inclines and snaps down onto the adjacent inclines, this snap movement from the battery to the magneto contacts being beyond the control of the operator.

The two parts of the switch are held together by the frictional engagement of the spring contacts 44 and 39 on the main block with the corresponding contacts 47 on the auxiliary block. The switch parts are concealed by a cover plate 49 which is held in place by screws 50, which pass through the main insulating block and serve also to secure said block to the upper part of the lock structure 14, as shown in Fig. 1. The screw 51 passes through said cover plate and into the auxiliary block 30', as shown in Figs. 4 and 9, thus preventing accidental separation of said parts. The advantage of the two-part structure is that the upper part may first be secured to the lock housing without danger of damaging conductors 48 by twisting them or bending them. After the installation has been completed, the conductors may be conveniently located, and thereafter the lower plug member fitted to the upper plug member.

It will be seen that the switch, which is complete in itself, may readily be applied to the housing and may be removed and taken apart in case repairs are necessary, the ready removal of said switch affecting in no way the effectiveness of the lock. Since the switch is actuated simply by a pin of insulating material or some other member having means for providing an insulated connection between the switch and the lock, it may be applied to any locking device on which a cam surface may be provided. It will also be seen that the actuation of the key operates the locking device and also operates the circuit opening switch without requiring an additional movement or operation by the driver. Although a key actuating lock is disclosed, it is apparent that a combination lock or other type of lock may be used. Furthermore, any other locking device may be used, the movement of which actuates said pin to control the ignition circuit or other circuit. Although the switch in the drawings is shown mounted in front of the portion of the housing which contains the lock, said switch may, of course, be mounted at the side, or in any other convenient relation to said housing and associated parts.

One of the advantages of my improved combination lock is that the driver is practically compelled to lock his car before leaving it. He must turn a key to operate a switch, in any case, in order to stop the engine, and with the construction described herein the same operation which stops the engine necessarily locks the car. The possibility of the driver neglecting to lock his car is therefore eliminated. Furthermore, the turning of said key necessarily opens the ignition circuit so that the car is locked, both mechanically and electrically. An additional advantage is that in order to start the car, the driver is necessarily compelled to start the engine first, and by so doing he simultaneously unlocks whatever part of the car is locked to prevent theft. With prior devices, drivers frequently have started the engine and then started to drive the car, forgetting that the steering wheel, for example, was inoperative, resulting in accidents due to the fact that the driver had no control over the moving car. An additional advantage is that the switch may be readily applied to any one of the three well-known types of locks, wheel locks, steering post locks and gear shift locks, as well as other locks, and is actuated merely by a pin passing through an opening in the housing of the lock whether the lock is of a rotating or reciprocating type. The only addition required to standard locks to accomplish this purpose is a cam or other simple means for actuating the pin.

The device is readily applied to a car of the type described, as it is merely necessary to remove the steering wheel and unscrew the cover of the planetary gear housing, after which the improved device may be screwed into place as a substitute for the original cover. Either the same steering wheel or a special steering wheel may be used as part of the equipment. The substituted part cannot be stolen as it is locked against rotation in a direction to unscrew it by the pawl and ratchet except when the key is inserted and the parts are unlocked by the owner, whereby the entire upper structure may be removed for inspection, oiling, etc. If the structure, when screwed down hard does not bring the switch into a convenient position it may be unscrewed a partial turn and held in the proper position by means of a set-screw.

The particular type of snap switch shown herein is merely illustrative of the character of switch which may be employed, and various changes may be made therein. In Figs. 10 and 11, I have shown a modified form of switch in which the circuit closing member snaps back and forth through a limited arc about a pivot. In this switch the insulating support is formed preferably in two separate parts 52, 53, which encloses a chamber between them. One circuit, for example, the magneto circuit is closed by bridging the contact members 54, 55. The other circuit, such as the battery circuit, may be closed by bridging the contact members 56 and the other end of the same contact 55. The bridging member in this instance is shown in the form of a U-shaped strip of metal 57, which is pivoted at point 58. It is held normally in one position or the other by a rod 59 surrounded by a coiled spring 60. One end of the rod passes through an opening in the transverse end of the U-shaped member, and the other end is connected with an extension on the pivoted switch handle 61, the latter being thrown back and forth by hand about its pivotal support 62, thereby compressing the spring 59 until the dead center is passed, after which the U-shaped member is thrown to the opposite extreme position with a snap action, which cannot be defeated by attempting to hold the switch handle 61 in some intermediate position. A resilient contact member 63 secured to the insulating base may be pressed against the head of the screw 64 which holds the common contact member 55 in position.

This operation opens and closes a common return circuit and is controlled by any suitable form of lock typified by the rotatable lock 65, shown in Fig. 11, and provided with a pin 66 which is reciprocated by the eccentric or cam 67 arranged, in this instance, at one end of the lock, as shown, and operated similarly to that previously described. In the present instance, however, the common return circuit is normally open and is closed only by the rotation of the key, whereas in the former switch, previously described, the common return circuit is normally closed and is open when the lock is actuated. However, it will be apparent that in both cases the relative arrangement may be reversed, if desired.

Various other changes may be made without departing from the invention as defined in the appended claims.

What I claim as new is:

1. A device of the class described comprising a block of insulating material having opposite recesses, two pairs of oppositely arranged contacts thereon, said contacts being arranged to provide a circular stepped path in one of said recesses, a circuit closing member arranged to bridge opposite contacts, a rotatable shaft for turning the same, a pair of circuit terminals representing two independent circuits, a third terminal representing a circuit common to the two, and a second switch in said other recess arranged to open said common circuit.

2. A device of the class described comprising a pair of readily separable members, one of which carries two switches, one of said switches being a snap-switch arranged to maintain closed either of two circuits at all times, and said other switch being arranged to open either of said circuits.

3. A device of the class described comprising a block of insulating material having oppositely disposed recesses, two pairs of oppositely arranged contacts in one of said recesses, said contacts being arranged to provide a circular stepped path, a circuit closing member arranged to bridge opposite contacts, a rotatable shaft for turning the same, a pair of circuit terminals representing two independent circuits, a third terminal representing a circuit common to the two, a switch in the other recess arranged to open said common circuit, a handle on said shaft for rotating the latter, and a pin for actuating said switch.

In testimony whereof, I have subscribed my name.

FRANKLIN W. STEWART.